(12) United States Patent
Brown et al.

(10) Patent No.: US 12,253,623 B2
(45) Date of Patent: *Mar. 18, 2025

(54) CORRUGATED RADOMES

(71) Applicant: Waymo LLC, Mountain View, CA (US)

(72) Inventors: Adam Brown, Mountain View, CA (US); Tegan Argo, Mountain View, CA (US); Benjamin Chen, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 306 days.

This patent is subject to a terminal disclaimer.

(21) Appl. No.: 17/664,814

(22) Filed: May 24, 2022

(65) Prior Publication Data
US 2022/0283264 A1 Sep. 8, 2022

Related U.S. Application Data

(63) Continuation of application No. 16/533,979, filed on Aug. 7, 2019, now Pat. No. 11,385,325.

(51) Int. Cl.
*G01S 7/02* (2006.01)
*G01S 7/03* (2006.01)
*G01S 13/931* (2020.01)

(52) U.S. Cl.
CPC ............ *G01S 7/027* (2021.05); *G01S 7/03* (2013.01); *G01S 13/931* (2013.01); *G01S 2013/93273* (2020.01)

(58) Field of Classification Search
CPC .. H01Q 1/42; H01Q 1/32; G01S 7/027; G01S 7/03; G01S 13/931; G01S 2013/93273
See application file for complete search history.

(56) References Cited

U.S. PATENT DOCUMENTS

| 3,576,581 | A | * | 4/1971 | Tricoles | .................. | H01Q 1/42 |
| | | | | | | 343/756 |
| 4,189,731 | A | * | 2/1980 | Rope | ........................ | H01Q 1/42 |
| | | | | | | 343/756 |

(Continued)

FOREIGN PATENT DOCUMENTS

| JP | 3871255 | 1/2007 |
| JP | 2007124565 | 5/2007 |
| WO | WO2012031427 | 3/2012 |

OTHER PUBLICATIONS

Griffiths, "Radomes Revealed", SatMagazine, www.satmagazine.com/story.php?number=1513724797, retrieved from the World Wide Web May 14, 2019.

(Continued)

*Primary Examiner* — Peter M Bythrow
(74) *Attorney, Agent, or Firm* — McDonnell Boehnen Hulbert & Berghoff LLP

(57) ABSTRACT

Example embodiments relate to corrugated radomes for protecting and concealing components of radar units. An example radar system may include a radar unit that includes at least one antenna having a radiation pattern. The radar unit is configured to transmit a radar signal based on the radiation pattern and receive radar signals. In addition, the radar system further includes a radome located in a direction of transmission of the radiation pattern. Particularly, the radome includes a stepped surface having at least one step that includes a height equal to one-quarter of a wavelength at a frequency of operation of the radar unit. The least one step is positioned on the radome such that the at least one step causes deconstructive interference of reflections of the transmitted radar signal caused by the radome.

20 Claims, 13 Drawing Sheets

Side View of Corrugated Radome

(56) References Cited

U.S. PATENT DOCUMENTS

| | | | | |
|---|---|---|---|---|
| 5,525,988 | A * | 6/1996 | Perkins | H01Q 17/001 342/4 |
| 5,844,518 | A * | 12/1998 | Berg | H01Q 17/008 342/4 |
| 6,489,927 | B2 * | 12/2002 | LeBlanc | H01Q 3/24 342/72 |
| 6,496,138 | B1 * | 12/2002 | Honma | H01Q 19/08 343/873 |
| 6,933,881 | B2 * | 8/2005 | Shinoda | H01Q 1/3233 342/70 |
| 6,977,610 | B2 | 12/2005 | Brookner et al. | |
| 7,541,970 | B1 * | 6/2009 | Godfrey | G01S 13/953 342/182 |
| 7,705,771 | B2 * | 4/2010 | Kato | G01S 7/35 342/88 |
| 7,710,312 | B2 * | 5/2010 | Kato | G01S 7/034 342/175 |
| 7,737,903 | B1 | 6/2010 | Rao | |
| 8,013,775 | B2 * | 9/2011 | Woods | H01Q 17/008 342/4 |
| 8,149,157 | B2 * | 4/2012 | Takeuchi | H01Q 1/3233 343/872 |
| 9,063,230 | B2 * | 6/2015 | Alland | G01S 7/025 |
| 9,610,912 | B2 * | 4/2017 | Schaaf | B60R 19/483 |
| 9,622,338 | B2 * | 4/2017 | Song | H01Q 15/0026 |
| 9,640,873 | B2 * | 5/2017 | Pfitzenmaier | H01Q 17/001 |
| 9,859,613 | B2 * | 1/2018 | Pontes | G01S 13/931 |
| 10,044,099 | B2 * | 8/2018 | Leung | H01Q 21/0075 |
| 11,385,325 | B2 * | 7/2022 | Brown | H01Q 1/42 |
| 2003/0052829 | A1 * | 3/2003 | Desargant | H01Q 1/526 343/705 |
| 2004/0036645 | A1 * | 2/2004 | Fujieda | H01Q 1/421 342/72 |
| 2004/0227663 | A1 * | 11/2004 | Suzuki | G01S 13/931 342/72 |
| 2005/0001757 | A1 * | 1/2005 | Shinoda | H01Q 1/42 342/70 |
| 2005/0017897 | A1 * | 1/2005 | Monk | H01Q 1/281 342/174 |
| 2005/0110673 | A1 * | 5/2005 | Izumi | H01Q 25/002 342/107 |
| 2006/0290564 | A1 * | 12/2006 | Sasada | G01S 13/931 342/107 |
| 2007/0159380 | A1 * | 7/2007 | Nagaishi | G01S 13/931 257/E25.031 |
| 2007/0241962 | A1 * | 10/2007 | Shinoda | H01Q 1/425 342/361 |
| 2009/0213019 | A1 * | 8/2009 | Schoebel | H01Q 1/3283 343/872 |
| 2011/0063183 | A1 * | 3/2011 | Sanford | H01Q 21/06 343/848 |
| 2011/0285604 | A1 * | 11/2011 | Le Bayon | H01Q 1/42 343/872 |
| 2013/0229299 | A1 * | 9/2013 | Matsuzawa | H01Q 1/421 342/146 |
| 2015/0097730 | A1 * | 4/2015 | Pontes | H01Q 1/40 342/385 |
| 2015/0123872 | A1 * | 5/2015 | Fujita | G01S 7/03 343/872 |
| 2015/0207217 | A1 * | 7/2015 | Fujita | H01Q 1/421 343/872 |
| 2016/0231417 | A1 * | 8/2016 | Aoki | G01S 7/032 |
| 2016/0320481 | A1 * | 11/2016 | Ling | G01S 13/87 |
| 2017/0222311 | A1 * | 8/2017 | Hess | G01S 13/931 |
| 2017/0301983 | A1 * | 10/2017 | Renilson | H01Q 1/424 |
| 2017/0307724 | A1 * | 10/2017 | Park | G01S 7/032 |
| 2019/0079177 | A1 * | 3/2019 | Lee | G01S 13/422 |
| 2019/0165462 | A1 * | 5/2019 | Shiozaki | H01Q 15/14 |
| 2019/0235050 | A1 * | 8/2019 | Maligeorgos | G01S 7/032 |
| 2019/0271762 | A1 * | 9/2019 | Sakai | G01S 13/93 |
| 2020/0041641 | A1 * | 2/2020 | Kocharyan | G01S 13/931 |
| 2020/0049808 | A1 * | 2/2020 | Bialer | G01S 13/931 |
| 2020/0300965 | A1 * | 9/2020 | Wu | G01S 13/505 |
| 2020/0309902 | A1 * | 10/2020 | Peng | H01Q 1/42 |
| 2020/0333432 | A1 * | 10/2020 | Kim | G01S 7/03 |
| 2021/0041529 | A1 * | 2/2021 | Brown | G01S 13/931 |

OTHER PUBLICATIONS

Kepesi et al., "Radar Signal Attenuation due to Finite Radome Thickness", Nase more, 62(3):200-203, 2015.

\* cited by examiner

CORRUGATED RADOMES

REFERENCE TO RELATED APPLICATION

This is a continuation of U.S. patent application Ser. No. 16/533,979, filed Aug. 7, 2019, the entirety of which is hereby incorporated by reference.

BACKGROUND

Radio detection and ranging systems ("radar systems") can be used to actively estimate distances to environmental features by emitting radio signals and detecting returning reflected signals. Distances to radio-reflective features can then be determined according to the time delay between transmission and reception. A radar system can emit a signal that varies in frequency over time, such as a signal with a time-varying frequency ramp, and then relate the difference in frequency between the emitted signal and the reflected signal to a range estimate. Some radar systems may also estimate relative motion of reflective objects based on Doppler frequency shifts in the received reflected signals.

Directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped.

SUMMARY

The present disclosure generally relates to radar systems and certain aspects of radomes designed to protect radar units within a radar system.

Accordingly, a first embodiment describes a radar system. The radar system comprises a radar unit that includes at least one antenna having a radiation pattern. The radar unit is configured to: (i) transmit a radar signal based on the radiation pattern, and (ii) receive radar signals. The radar system further includes a radome located in a direction of transmission of the radiation pattern. The radome includes a stepped surface having at least one step. The at least one step includes a height equal to one-quarter of a wavelength at a frequency of operation of the radar unit, and the least one step is positioned on the radome such that the at least one step causes deconstructive interference of reflections of the transmitted radar signal caused by the radome.

A second embodiment describes a radar unit. The radar unit includes at least one antenna having a radiation pattern. The radar unit is configured to: (i) transmit a radar signal based on the radiation pattern, and (ii) receive radar signals. The radar unit further includes a radome located in a direction of transmission of the radiation pattern. The radome includes a stepped surface having at least one step. The at least one step includes a height equal to one-quarter of a wavelength at a frequency of operation of the radar unit, and the least one step is positioned on the radome such that the at least one step causes deconstructive interference of reflections of the transmitted radar signal caused by the radome.

A third embodiment describes a method of operating a radar system. The method involves transmitting, using a radar unit that includes at least one antenna having a radiation pattern, a radar signal based on the radiation pattern. The radar system includes a radome located in a direction of transmission of the radiation pattern. The radome includes a stepped surface having at least one step. The at least one step includes a height equal to one-quarter of a wavelength at a frequency of operation of the radar unit, and the least one step is positioned on the radome such that the at least one step causes deconstructive interference of reflections of the transmitted radar signal caused by the radome. The method further involves receiving, using the radar unit, one or more reflections of the transmitted radar signal caused by one or more surfaces in an environment of the radar system.

A fourth embodiment may involve a system that includes various means for carrying out each of the operations of the first, second, and third embodiments.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
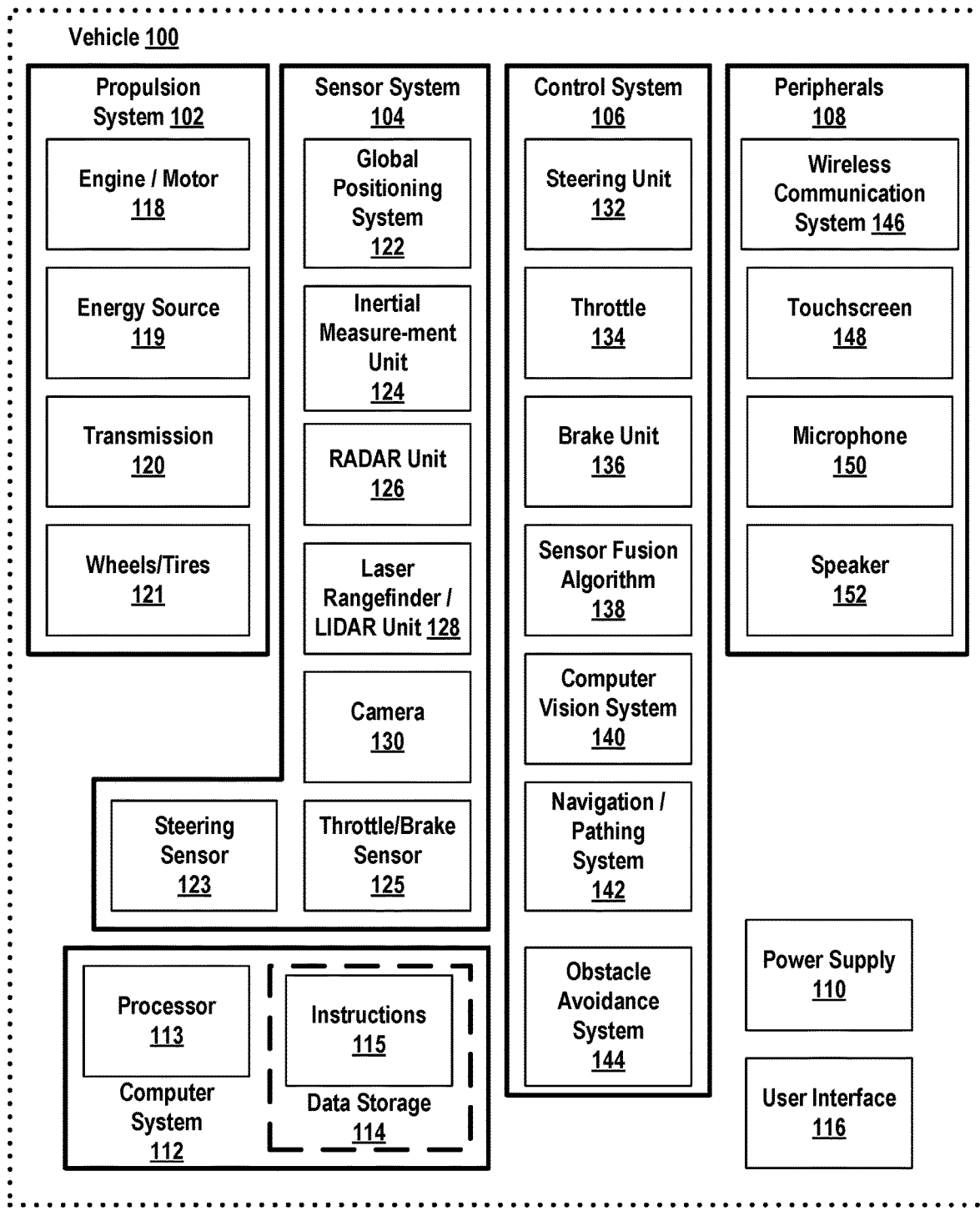
FIG. 1 is a functional block diagram illustrating a vehicle, according to one or more example embodiments.
Figure 2A:
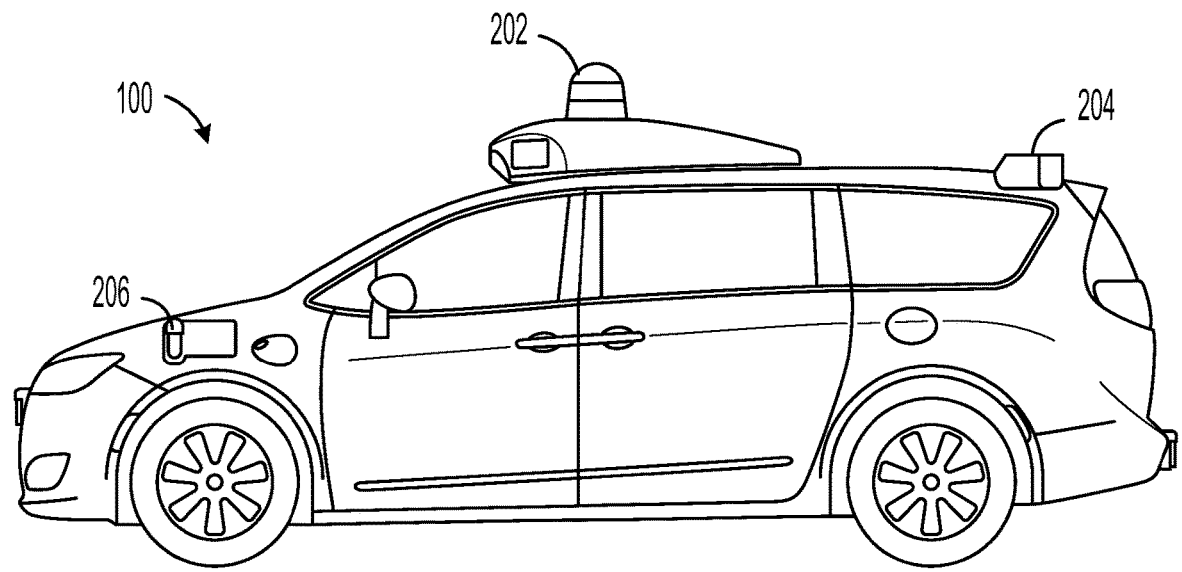
FIG. 2A illustrates a side view of a vehicle, according to one or more example embodiments.
Figure 2B:
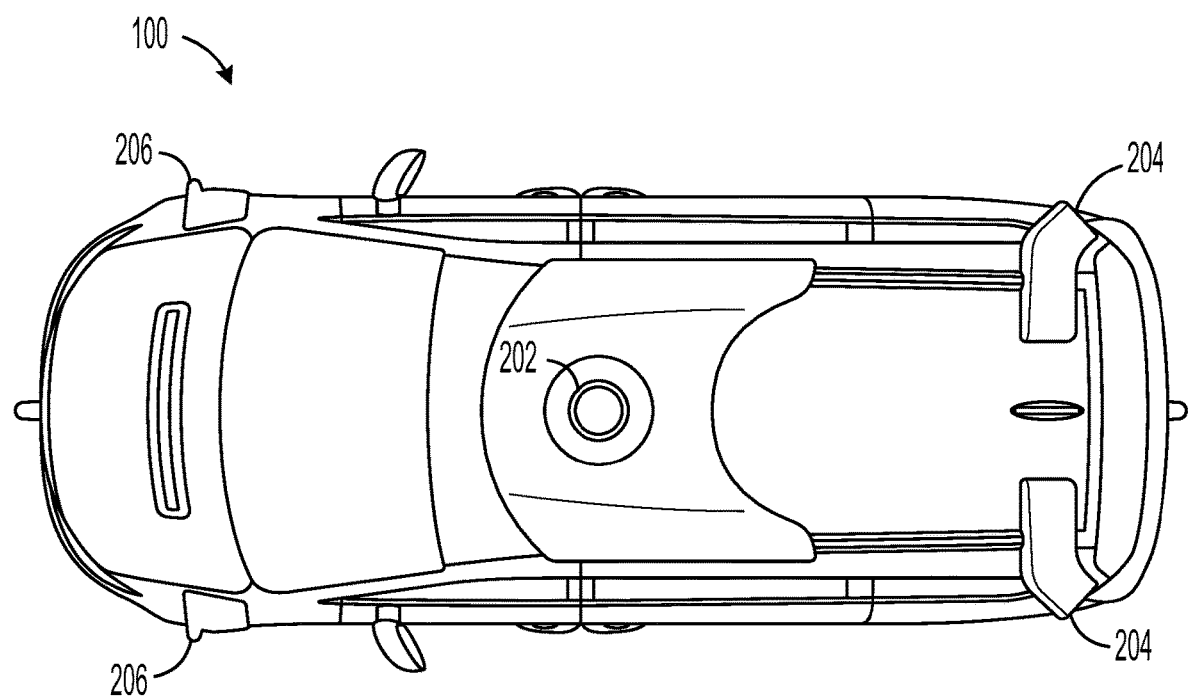
FIG. 2B illustrates a top view of a vehicle, according to one or more example embodiments.
Figure 2C:
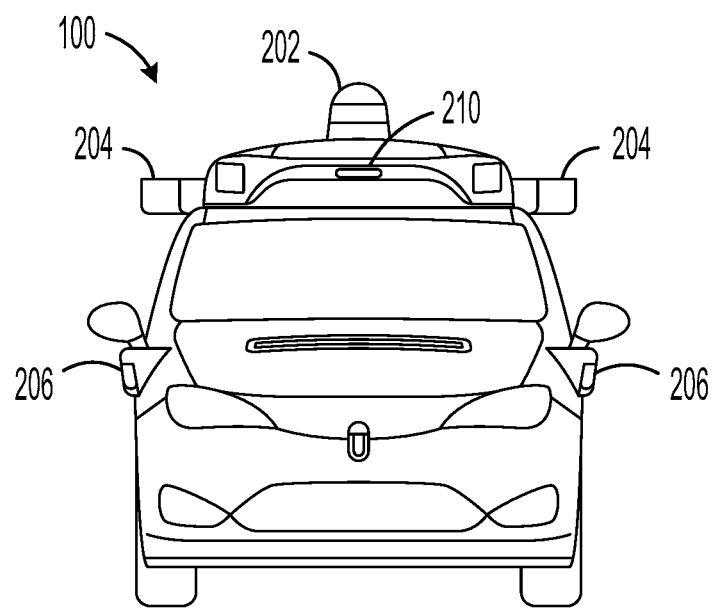
FIG. 2C illustrates a front view of a vehicle, according to one or more example embodiments.
Figure 2D:
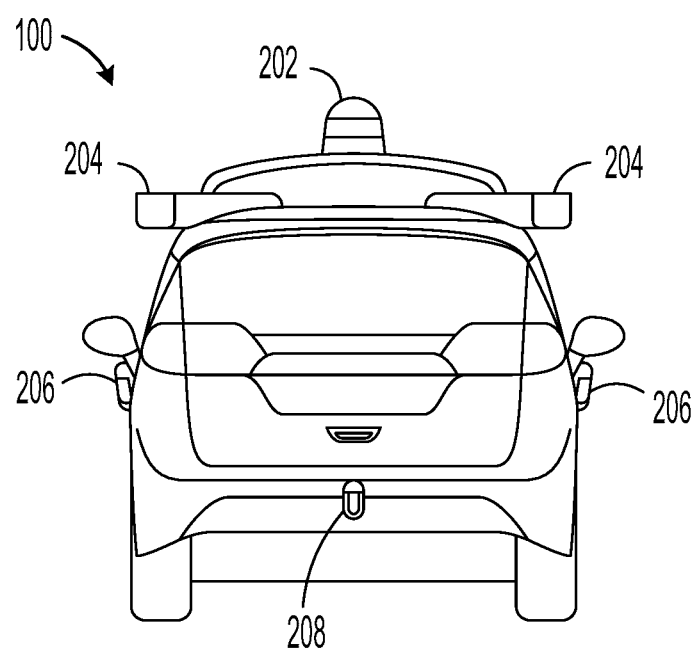
FIG. 2D illustrates a back view of a vehicle, according to one or more example embodiments.
Figure 2E:
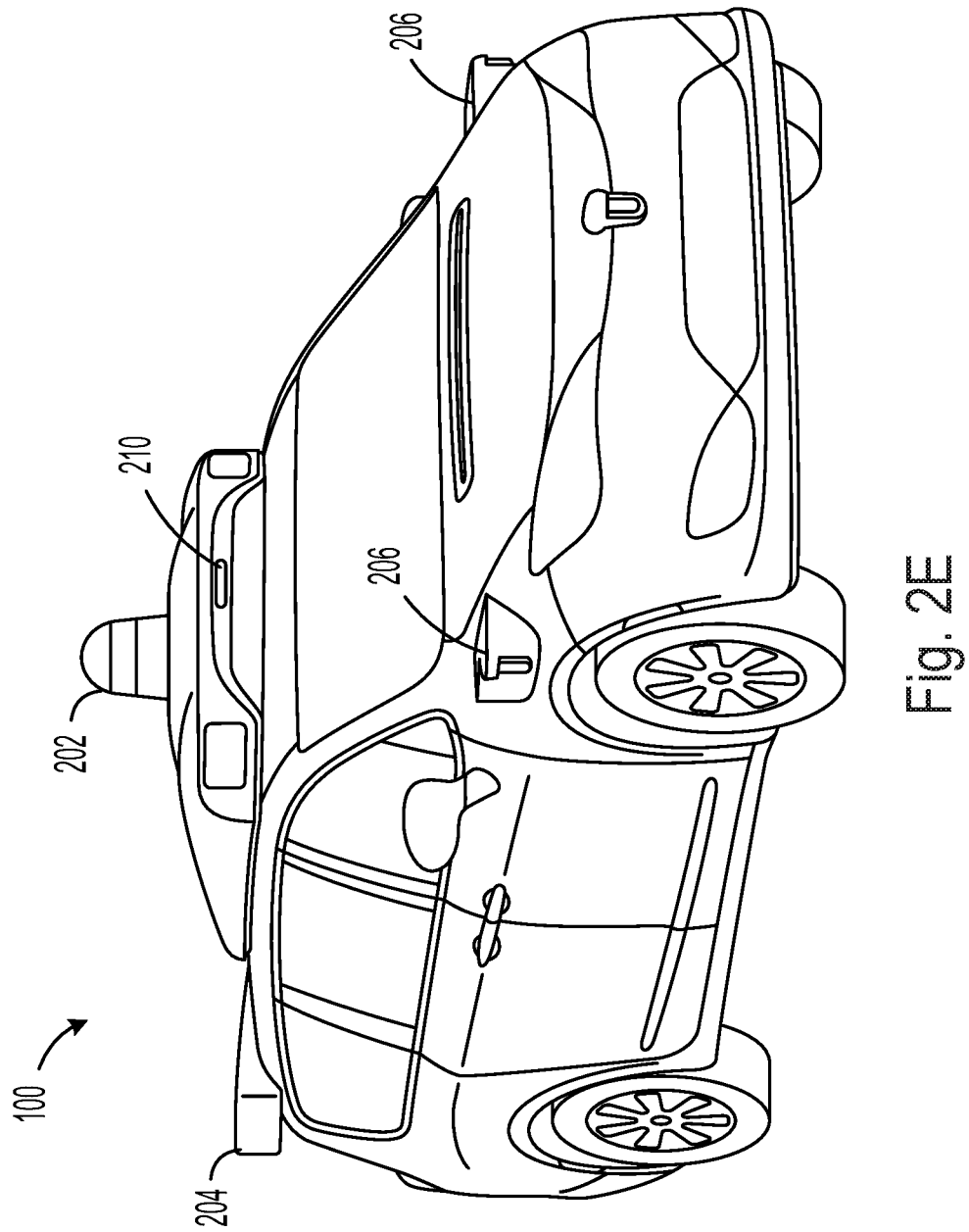
FIG. 2E illustrates an additional view of a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A radar system uses one or more antennas to emit (i.e. transmit) radar signals to measure aspects of an environment. Upon coming into contact with surfaces in the environment, emitted radar signals can scatter in multiple directions with some penetrating into various surfaces while others reflect off surfaces and back towards one or more reception antennas of the radar system. Once received by one or more reception antennas, radar reflections can be processed to generate two dimensional (2D) and/or three dimensional (3D) measurements of the environment. In particular, these measurements may convey the positions, orientations, and movements of nearby surfaces occupying the environment near the radar system.

Because radar systems can measure distances and motions of nearby objects and other surfaces, they are increasingly being used to assist with vehicle navigation and improve safety. Particularly, measurements from a vehicle radar system can enhance overall performance and safety during vehicle navigation. The vehicle radar system can detect and identify the positions, orientations, and movements of nearby vehicles. Radar measurements can also reveal information about other features in the vehicle's surrounding environment, such as road boundaries and road conditions (e.g., smooth or bumpy surfaces), weather conditions (e.g., wet or snowy roadways), traffic signs and signals, and pedestrians. In some instances, radar measurements are used to assist a driver controlling the vehicle. For instance, radar measurements may be used to generate alerts when the vehicle is too close to another vehicle or object. Radar measurements can also be used to develop control strategies for autonomous or semi-autonomous navigation of the vehicle.

Some vehicle radar systems are installed by attaching radar units at different exterior locations on a vehicle. For instance, one or more radar units may be coupled to the vehicle at various positions, such side mirrors, bumpers, the roof, front grill, doors, the trunk, or side panels on the vehicle. Using exterior locations to attach and position radar units can enable swift installation of the radar system on a standard vehicle without requiring redesigning and specially manufacturing the vehicle. In addition, the orientation and position of radar units when the units are coupled at exterior vehicle locations can be easily adjusted. This can speed up the installation and calibration process. By using exterior positions on the vehicle, the radar units may be able to capture measurements from optimal positions and orientations on the vehicle.

When coupled at these exterior locations on the vehicle, however, the radar units may undesirably encounter contact from road debris, which can damage and degrade the performance of the radar system. For instance, as the vehicle navigates a path, debris (e.g., rocks, pieces of road) may be kicked up and propelled towards the radar units by the vehicle and other nearby vehicles. This debris can damage the radar units and impact subsequent performance of the vehicle radar system overall. It might not be safe to allow a vehicle to operate autonomously using a damaged radar unit. As such, repairing or replacing damaged radar units can be costly and time consuming.

Additionally, weather conditions can also create conditions that undesirably impact unprotected radar units coupled at exterior positions on the vehicle. Rain, hail, sleet, snow, and other weather conditions can undesirably come into contact with radar units and impact each unit's performance and condition. Puddles and snow that accumulate on the road can be propelled towards the vehicle by nearby vehicles and similarly degrade the performance of the vehicle radar system. Thus, exposure to weather elements can cause radar units to degrade and perform less optimally over time. Furthermore, any radar unit coupled at an exterior location on a vehicle is also exposed to undesirable contact from pedestrians, such as while the vehicle is parked and not in use.

To overcome these potential issues as well as others that can arise when placing radar units on the exterior of a vehicle, radomes may be used. A radome is a protective cover for a radar unit that is designed to protect and conceal components of the radar unit. A radar unit's radome may protect a portion or an entirety of the radar unit, including internal components. For example, a radome may be configured to couple to a radar unit such that an empty space exists between the radome and antennas of the radar unit. As such, the radome may enclose the antennas of the radar unit and provide protection from undesirable environmental factors, such as debris and weather elements.

Ideally, a radome would not have any impact on the radar signals transmitted and received by a radar unit. In practice, however, the radome may undesirably impact the performance of the radar unit.

Because a radome is made out of a material that can provide protection to a radar unit, the radome may have a characteristic impedance that differs from the characteristic impedance of free space. This difference in impedance, even when minimal, can still undesirably impact the performance of the radar unit. In particular, the impedance mismatch between the radome and air may cause the reflection of a percentage of the energy in the transmitted signals back to towards one or more transmitting antennas when the radar unit is operating, rather than allowing all of the energy in the transmitted signals to propagate into the environment as intended. As a result, energy can be reflected by the radome and trapped near the radar unit's antennas causing interference, being received by a receiver of the radar unit, and degrading overall performance by other means as well.

In some cases, the radome may cause some transmitted signals (or portions of transmitted signals) to bounce in the empty space created between the radome and the radar unit one or more times before the signals traverse into the environment. Also known as "ringing", these bouncing radar signal reflections can cause position dependent phase errors, which can further limit the phase stability of channels in an antenna array with a wide field of view. In some instances, ringing reflections caused by the radar unit's radome may also limit the sidelobe performance of the radar unit by the "ringing" signals propagating away from the radar unit and seeming to have been transmitted by a different position than the actual location of the antenna.

Example embodiments presented herein involve corrugated (e.g. stepped) radomes designed and positioned to reduce undesirable effects that can arise when using radomes to protect and conceal radar units. Similar to a basic radome, a corrugated radome may be located in a direction of transmission of a radar unit's radiation pattern and serve to protect the radar unit. Unlike the basic radome, however, the corrugated radome utilizes a corrugated step pattern to compensate for radar signal reflections caused by the corrugated radome. In particular, the corrugated step pattern may include one or more steps configured to reduce the impact of using the corrugated radome to protect the radar unit. For instance, the corrugated step pattern may include one or more steps that have a height equal to one-quarter of the wavelength of operation of the radar signal. By having the height of the step equal to one-quarter of the wavelength, two signals reflected from adjacent steps would be 180-degrees out of phase with each other. Due to being 180-degrees out of phase, the signals would deconstructively interfere with each other, and approximately cancel each other out (or at least a portion of the signals cancel out). Based on the design criteria for the radar unit, a step height may be chosen to cause the deconstructive interference of reflections.

By positioning one or more steps in directions where radome reflections are expected to occur, deconstructive interference of radar reflections should approximately cancel each other out (as a path length of two signals, one reflecting off a low step and one reflecting off a high step, will be 180 degrees out of phase). Thus, the corrugated step pattern may cause deconstructive interference of the undesired reflected radar signals.

The corrugated step pattern associate with a corrugated radome for a radar unit may differ within examples. For example, a corrugate radome may be configured with corrugation steps that commensurate with steps having a step offset of a quarter of a wavelength at the multipath angle to suppress interference in a manner similar to tilting the radome relative to radar unit's plane of antennas. In some other examples, the height of the steps may be chosen based on an angle at which the radar signals will strike the radome. The step height may be chosen so that signals deconstructively interfere with each other when the signals are transmitted at the given angle.

In some other examples, the height of the steps may be different, such as three-quarters of wavelength. The height and width of the steps may vary based on various factors, such as the arrangement and desired operation of the antennas of the radar unit. Further, some examples may involve variations among the steps within the corrugated pattern. For instance, some steps may be equal to one-quarter of the wavelength and other steps may be equal to three-quarters of the wavelength. Additional configurations for corrugated radomes are described below.

The following detailed description may be used with an apparatus (e.g., radar unit) having one or multiple antenna arrays. The one or multiple antenna arrays may take the form of a single-input single-output single-input, multiple-output (SIMO), multiple-input single-output (MISO), multiple-input multiple-output (MIMO), and/or synthetic aperture radar (SAR) radar antenna architecture.

In some embodiments, example radar unit architecture may include a plurality of "dual open-ended waveguide" (DOEWG) antennas. The term "DOEWG" may refer to a short section of a horizontal waveguide channel plus a vertical channel that splits into two parts. Each of the two parts of the vertical channel may include an output port configured to radiate at least a portion of electromagnetic waves that enters the radar unit. Additionally, in some instances, multiple DOEWG antennas may be arranged into one or more antenna arrays.

Some example radar systems may be configured to operate at an electromagnetic wave frequency in the W-Band (e.g., 77 Gigahertz (GHz)). The W-Band may correspond to electromagnetic waves on the order of millimeters (e.g., 1 mm, 4 mm). A radar system may use one or more antennas that can focus radiated energy into tight beams to measure an environment with high accuracy. Such antennas may be compact (typically with rectangular form factors), efficient (i.e., with little of the 77 GHz energy lost to heat in the antenna or reflected back into the transmitter electronics), low cost and easy to manufacture (i.e., radar systems with these antennas can be made in high volume).

Some example radar architecture may include multiple metal layers (e.g., aluminum plates) machined with computer numerical control (CNC), aligned and joined together. For example, a metal layer may include a first half of an input waveguide channel, where the first half of the first waveguide channel includes an input port that may be configured to receive electromagnetic waves (e.g., W-band waves) into the first waveguide channel. The metal layer may also include a first half of a plurality of wave-dividing channels. The plurality of wave-dividing channels may comprise a network of channels that branch out from the input waveguide channel and that may be configured to receive the electromagnetic waves from the input waveguide channel, divide the electromagnetic waves into a plurality of portions of electromagnetic waves (i.e., power dividers), and propagate respective portions of electromagnetic waves to respective wave-radiating channels of a plurality of wave-radiating channels. The waveguide antenna elements and/or the waveguide output ports may be rectangular in shape, in some embodiments. In alternative embodiments, the waveguide antenna elements and/or the waveguide output ports may be circular in shape. Other shapes are also possible.

Based on the shape and the materials of the corresponding polarization-modification channels and waveguides, the distribution of propagating energy can vary at different locations within a radar unit, for example. The shape and the materials of the polarization-modification channels and waveguides can define the boundary conditions for the electromagnetic energy. Boundary conditions are known conditions for the electromagnetic energy at the edges of the polarization-modification channels and waveguides. For example, in a metallic waveguide, assuming the polarization-modification channel and waveguide walls are nearly perfectly conducting (i.e., the waveguide walls can be approximated as perfect electric conductors—PECs), the boundary conditions specify that there is no tangentially (i.e., in the plane of the waveguide wall) directed electric field at any of the wall sides. Once the boundary conditions are known, Maxwell's Equations can be used to determine how electromagnetic energy propagates through the polarization-modification channels and waveguides.

Maxwell's Equations may define several modes of operation for any given polarization-modification channel or waveguide. Each mode has one specific way in which electromagnetic energy can propagate through the polarization-modification channel or waveguide. In addition, each mode has an associated cutoff frequency. A mode is not supported in a polarization-modification channel or waveguide if the electromagnetic energy has a frequency that is below the cutoff frequency. By properly selecting both (i) dimensions and (ii) frequency of operation, electromagnetic energy may propagate through the polarization-modification channels and waveguides in specific modes. The polarization-modification channels and/or the waveguides can be designed so only one propagation mode is supported at the design frequency.

There are four main types of waveguide propagation modes: Transverse Electric (TE) modes, Transverse Magnetic (TM) modes, Transverse Electromagnetic (TEM) modes, and Hybrid modes. In TE modes, the electromagnetic energy has no electric field in the direction of the electromagnetic energy propagation. In TM modes, the electromagnetic energy has no magnetic field in the direction of the electromagnetic energy propagation. In TEM modes, the electromagnetic energy has no electric or magnetic field in the direction of the electromagnetic energy propagation. In Hybrid modes, the electromagnetic energy has some of both electric field and magnetic field the direction of the electromagnetic energy propagation.

TE, TM, and TEM modes can be further specified using two suffix numbers that correspond to two directions orthogonal to the direction of propagation, such as a width direction and a height direction. A non-zero suffix number indicates the respective number of half-wavelengths of the electromagnetic energy equal to the width and height of the respective polarization-modification channel or waveguide (e.g., assuming a rectangular waveguide). However, a suffix number of zero indicates that there is no variation of the field with respect to that direction. For example, a $TE_{10}$ mode indicates the polarization-modification channel or waveguide is half-wavelength in width and there is no field variation in the height direction. Typically, when the suffix number is equal to zero, the dimension of the waveguide in the respective direction is less than one-half of a wavelength. In another example, a $TE_{21}$ mode indicates the waveguide is one wavelength in width (i.e., two half wavelengths) and one half wavelength in height.

When operating a waveguide in a TE mode, the suffix numbers also indicate the number of field-maximums along the respective direction of the waveguide. For example, a $TE_{10}$ mode indicates that the waveguide has one electric field maximum in the width direction and zero maxima in the height direction. In another example, a $TE_{21}$ mode indicates that the waveguide has two electric field maxima in the width direction and one maximum in the height direction.

Additionally or alternatively, different radar units using different polarizations may prevent interference during operation of the radar system. For example, the radar system may be configured to interrogate (i.e., transmit and/or receive radar signals) in a direction normal to the direction of travel of an autonomous vehicle via SAR functionality. Thus, the radar system may be able to determine information about roadside objects that the vehicle passes. In some examples, this information may be two dimensional (e.g., distances various objects are from the roadside). In other examples, this information may be three dimensional (e.g., a point cloud of various portions of detected objects). Thus, the vehicle may be able to "map" the side of the road as it drives along, for example.

Some examples may involve using radar units having antenna arrays arranged in MIMO architecture. Particularly, the filter may be determined to adjust near-field measurements may by a radar unit having antenna arrays arranged in MIMO architecture. Radar signals emitted by the transmission antennas are orthogonal to each other and can be received by one or multiple corresponding reception antennas. As such, the radar system or associated signal processor can perform 2D SAR image formation along with a 3D matched filter to estimate heights for pixels in a 2D SAR map formed based on the processed radar signals.

If two autonomous vehicles are using analogous radar systems to interrogate the environment (e.g., using the SAR technique described above), it could also be useful for those autonomous vehicles to use different polarizations (e.g., orthogonal polarizations) to do the interrogation, thereby preventing interference. Additionally, a single vehicle may operate two radars units having orthogonal polarizations so that each radar unit does not interfere with the other radar unit.

Further, the configuration of a radar system can differ within examples. For instance, some radar systems may consist of radar units that are each configured with one or more antennas arrays. An antenna array may involve a set of multiple connected antennas that can work together as a single antenna to transmit or receive signals. By combining multiple radiating elements (i.e., antennas), an antenna array may enhance the performance of the radar unit when compared to radar units that use non-array antennas. In particular, a higher gain and narrower beam may be achieved when a radar unit is equipped with one or more antenna arrays. As a result, a radar unit may be designed with antenna arrays in a configuration that enables the radar unit to measure particular regions of the environment, such as targeted areas positioned at different ranges (distances) from the radar unit.

Radar units configured with antenna arrays can differ in overall configuration. For instance, the number of arrays, position of arrays, orientation of arrays, and size of antenna arrays on a radar unit can vary in examples. In addition, the quantity, position, alignment, and orientation of radiating elements (antennas) within an array of a radar unit can also vary. As a result, the configuration of a radar unit may often depend on the desired performance for the radar unit. For example, the configuration of a radar unit designed to measure distances far from the radar unit (e.g., a far range of the radar unit) may differ compared to the configuration of a radar unit used to measure an area nearby the radar unit (e.g., a near field of the radar unit).

To further illustrate, in some examples, a radar unit may include the same number of transmission antenna arrays and reception antenna arrays (e.g., four arrays of transmission antennas and four arrays of reception antennas). In other examples, a radar unit may include a number of transmission antenna arrays that differs from the number of reception antenna arrays (e.g., 6 transmission antenna arrays and 3 reception antenna arrays). In addition, some radar units may operate with parasitic arrays that can control radar transmissions. Other example radar units may include one or multiple driven arrays that have radiating elements connected to an energy source, which can have less overall energy loss when compared to parasitic arrays.

Antennas on a radar unit may be arranged in one or more linear antenna arrays (i.e., antennas within an array are aligned in a straight line). For instance, a radar unit may include multiple linear antenna arrays arranged in a particular configuration (e.g., in parallel lines on the radar unit). In other examples, antennas can also be arranged in planar arrays (i.e., antennas arranged in multiple, parallel lines on a single plane). Further, some radar units can have antennas arranged in multiple planes resulting in a three dimensional array.

A radar unit may also include multiple types of arrays (e.g., a linear array on one portion and a planar array on another portion). As such, radar units configured with one or more antenna arrays can reduce the overall number of radar units a radar system may require to measure a surrounding environment. For example, a vehicle radar system may include radar units with antenna arrays that can be used to measure particular regions in an environment as desired while the vehicle navigates.

Some radar units may have different functionality and operational characteristics. For example, a radar unit may be configured for long-range operation and another radar unit may be configured for short-range operation. A radar system may use a combination of different radar units to measure different areas of the environment. Accordingly, it may be desirable for the signal processing of short-range radar units to be optimized for radar reflections in the near-field of the radar unit.

Referring now to the figures, FIG. 1 is a functional block diagram illustrating example vehicle 100. Vehicle 100 may represent a vehicle capable of operating fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors (e.g., sensor system 104) to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. The subsystems and components of vehicle 100 may be interconnected in various ways (e.g., wired or wireless connections). In other examples, vehicle 100 may include more or fewer subsystems. In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, one or more electric motors, steam engine, or Stirling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, one or more radar units 126, laser rangefinder/LIDAR unit 128, camera 130, steering sensor 123, and throttle/brake sensor 125, among other possible sensors. In some implementations, sensor system 104 may also include sensors configured to monitor internal systems of the vehicle 100 (e.g., $O_2$ monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects (e.g., radar signals), including the speed and heading of the objects, within the local environment of vehicle 100. As such, radar unit 126 may include one or more radar units equipped with one or more antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/LIDAR 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communication, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A, 2B, 2C, 2D, and 2E illustrate different views of a physical configuration of vehicle 100. The various views are included to depict example sensor positions 202, 204, 206, 208, 210 on vehicle 100. In other examples, sensors can have different positions on vehicle 100. Although vehicle 100 is depicted in FIGS. 2A-2E as a van, vehicle 100 can have other configurations within examples, such as a truck, a car, a semi-trailer truck, a motorcycle, a bus, a shuttle, a golf cart, an off-road vehicle, robotic device, or a farm vehicle, among other possible examples.

As discussed above, vehicle 100 may include sensors coupled at various exterior locations, such as sensor positions 202-210. Vehicle sensors include one or more types sensors with each sensor configured to capture information from the surrounding environment or perform other operations (e.g., communication links, obtain overall positioning information). For example, sensor positions 202-210 may serve as locations for any combination of one or more cameras, radars, LIDARs, range finders, radio devices (e.g., Bluetooth and/or 802.11), and acoustic sensors, among other possible types of sensors.

When coupled at the example sensor positions 202-210 shown in FIGS. 2A-2E, various mechanical fasteners may be used, including permanent or non-permanent fasteners. For example, bolts, screws, clips, latches, rivets, anchors, and other types of fasteners may be used. In some examples, sensors may be coupled to the vehicle using adhesives. In further examples, sensors may be designed and built as part of the vehicle components (e.g., parts of the vehicle mirrors).

In some implementations, one or more sensors may be positioned at sensor positions 202-210 using movable mounts operable to adjust the orientation of one or more sensors. A movable mount may include a rotating platform that can rotate sensors so as to obtain information from multiple directions around vehicle 100. For instance, a sensor located at sensor position 202 may use a movable mount that enables rotation and scanning within a particular range of angles and/or azimuths. As such, vehicle 100 may include mechanical structures that enable one or more sensors to be mounted atop the roof of vehicle 100. Additionally, other mounting locations are possible within examples.

Figure 3:
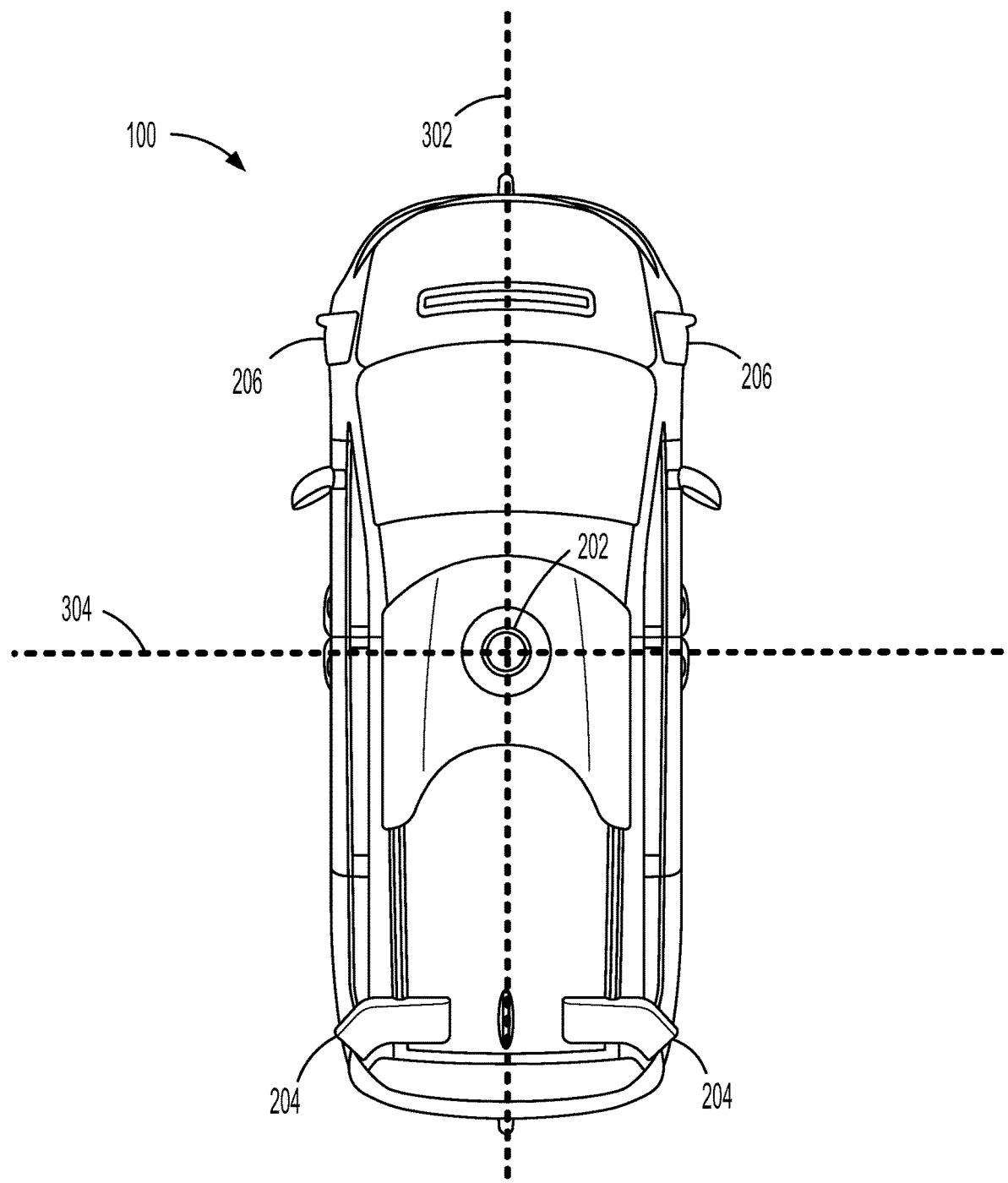
FIG. 3 illustrates a layout of radar sectors, according to one or more example embodiments.

FIG. 3 illustrates an example layout of radar sectors, according to one or more embodiments. As shown, each radar sector may have an angular width approximately equal to the scanning range of the radar units. For example, the sectors may divide the azimuth plane around vehicle 100 into multiple sectors (e.g., 90 degree sectors, 120 degree sectors). In various different examples, scanning may be performed on the transmit side, the receive side, or both. For example, scanning on the transmit side may include iteratively transmitting a radar signal in predetermined directions and receiving radar signals across the full sector. In another example, scanning on the receive side may include transmitting a radar signal across the full sector and receiving radar signals across the full sector and performing digital beamforming on the received signals. In other examples, different forms of scanning may be used as well.

The example radar sectors may align with axes 302, 304 relative to vehicle 100. In some instances, each radar unit may be configured to scan across one sector. Further, because each example radar unit of FIG. 3 has a scanning angle of approximately 90 degrees, each radar unit scans a region that may not overlap with the scanning angle of other radar units. In other examples, the sectors may overlap.

In order to achieve radar sectors defined by the midpoints of vehicle 100, each radar unit may be mounted at a 45-degree angle with respect to the two axes of vehicle 100. By mounting each radar unit a 45 degree angle with respect to the two axes of vehicle 100, a 90 degree scan of the radar unit would scan from one vehicle axis to the other vehicle axis. For example, radar units mounted at a 45-degree angle to the axes at sensor positions 206 may be able to scan the front left and front right sectors (from vertical axis 302 through the front of vehicle 100 to horizontal axis 304 that runs through the sides of the vehicle, respectively). In order to scan the back right and back left sectors, radar units may be mounted at sensor positions 204. The radar unit placements shown in FIG. 3 are merely to illustrate one possible example.

In various other examples, radar units may be placed in other locations, such as on top or along (or within) other portions of the vehicle, and/or coupled to the underbody of vehicle 00. Further, the sectors may also be defined differently in other embodiments. For example, the sectors may be at a 45-degree angle with respect to the vehicle. In this example, one radar unit may face forward, another backward, and the other two to the sides of the vehicle.

In some examples, all the radar units of vehicle 100 may be configured with the same scanning angle. The azimuth plane around the vehicle is equal to a full 360 degrees. Thus, if each radar unit is configured with the same scanning angle, then the scanning angle for the radar units would be equal to approximately 360 divided by the number of radar units on the vehicle. Thus, for full azimuth plane scanning, vehicle 100 with one radar unit would need that radar unit to be able to scan over the full 360 degrees.

If vehicle 100 had two radar units, each would scan approximately 180 degrees. For three radar units, each would be configured to scan 120 degrees. For four radar units, as shown in FIG. 3, each may scan approximated 90 degrees. Five radar units may be configured on vehicle 100 and each may be able to scan 72 degrees. Further, six radar units may be configured on vehicle 100 and each may be able to scan approximately 60 degrees. Other examples are possible In further examples, the number of radar units may be chosen based on a number of criteria, such as ease of manufacture of the radar units, vehicle placement, or other criteria. For example, some radar units may be configured with a planar structure that is sufficiently small. The planar radar unit may be mountable at various positions on a vehicle. For example, a vehicle may have a dedicated radar housing mounted on the top of the vehicle. The radar housing may contain various radar units. In other embodiments, radar units may be placed within the vehicle structure.

In some embodiments, it may be desirable to place radar units in positions where the object covering the radar unit is at least partially transparent to radar. For example, various plastics, polymers, and other materials may form part of the vehicle structure and cover the radar units, while allowing the radar signal to pass through.

Additionally, in some embodiments, the radar units may be configured with different scanning ranges for different radar units. In some embodiments, a specific radar unit with a wide scanning angle may not be able to be placed on the vehicle in the proper location. Thus, a smaller radar unit, with a smaller scanning angle may be placed in that location. However, other radar units may be able to have larger scanning angles. Therefore, the total scanning angle of the radar units may add up to 360 degrees (or more) and provide full 360 degree azimuthal scanning. For example, a vehicle may have 3 radar units that each scan over 100 degrees and a fourth radar unit that scans over 60 degrees. Thus, the radar units may be able to scan the full azimuth plane, but the scanning sectors may not be equal in angular size.

Figure 4A:
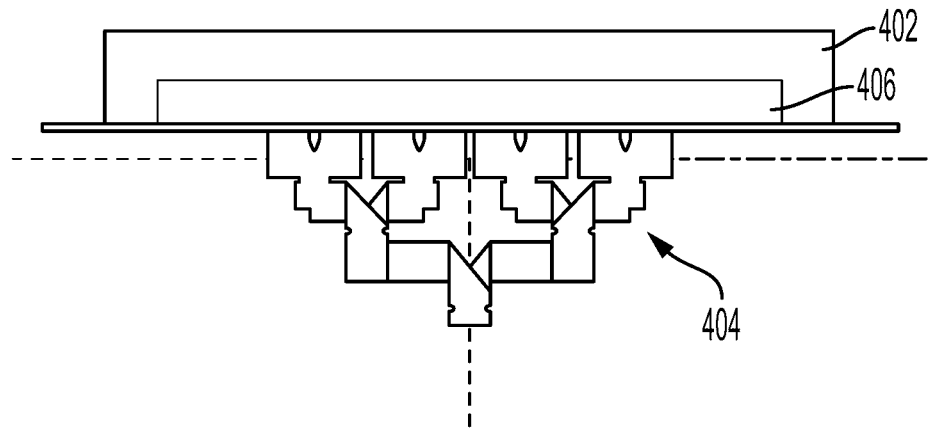
FIG. 4A illustrates a basic radome for a radar unit, according to one or more example embodiments.
Figure 4B:
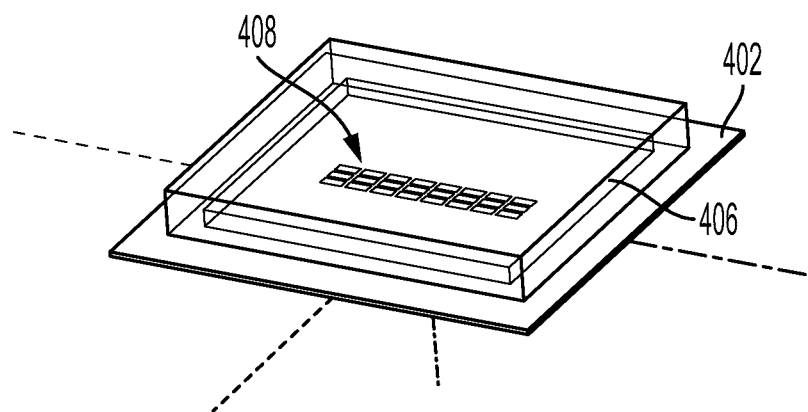
FIG. 4B illustrates another view of the basic radome for the radar unit, according to one or more example embodiments.

FIGS. 4A and 4B illustrate a basic radome for a radar unit, according to example embodiments. Basic radome 402 represents an example radome configuration that provides protection to a radar unit (i.e., radar unit 404), but can also impact the performance of the radar unit.

As shown in FIGS. 4A and 4B, basic radome 402 is coupled to radar unit 404 such that empty space 406 is created between basic radome 402 and radar unit 404. More specifically, basic radome 402 is in a parallel alignment with the plane of antennas 408 of radar unit 404. As a result, basic radome 402 may undesirably impact the performance of radar unit 404. Particularly, some radar signals (or portions of radar signals) transmitted by antennas 408 may reflect off basic radome 402 and remain inside empty space 406. Other radar signals (or portions of radar signals) transmitted by antennas 408 may ring in empty space 406 (i.e., bounce back and forth between radar unit 404 and an inner surface of basic radome 402). As such, energy from radar signals that remain in empty space 406 and reflections of ringing radar signals can cause interference and degrade the performance of radar unit 404. Thus, the difference in impedance caused by basic radome 402 may negatively impact the performance of radar unit 404.

Figure 5:
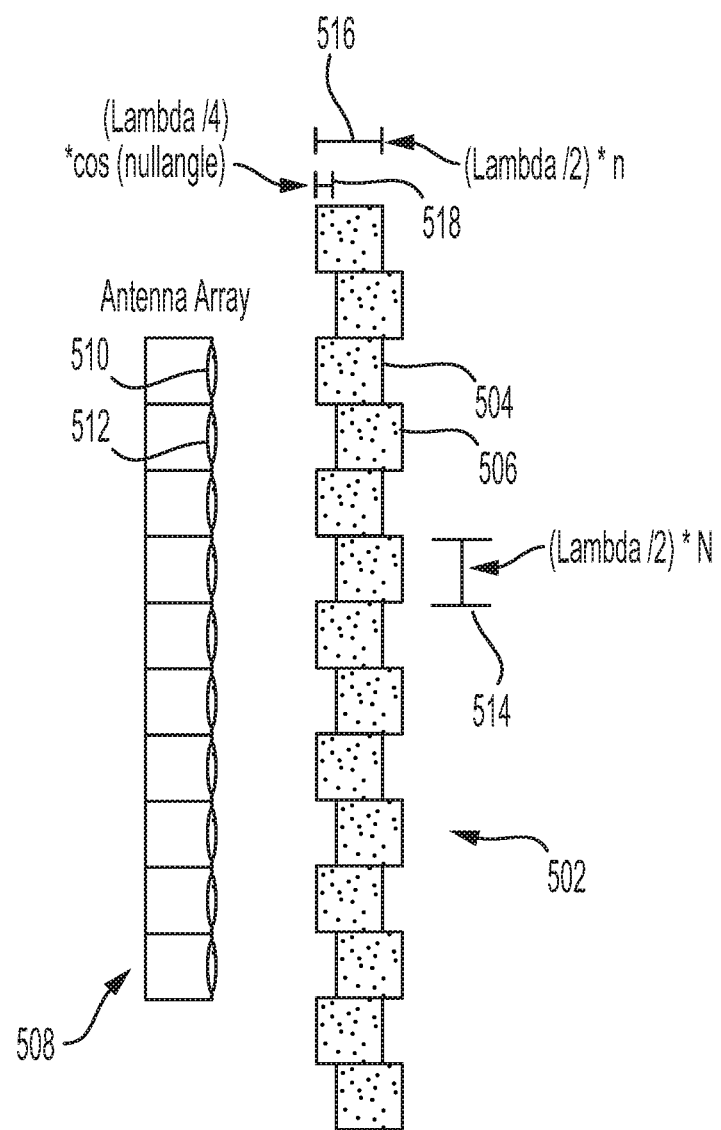
FIG. 5 illustrates a corrugated radome, according to one or more example embodiments.

FIG. 5 illustrates a corrugated radome configuration, according to one or more example embodiments. Shown from a side view, corrugated radome 502 represents an example radome with a corrugated pattern configured to minimize the impact that the radome has on the operation of a radar unit. Particularly, corrugated radome 502 may provide protection and conceal components for a radar unit that includes antenna array 508. As shown in FIG. 5, antenna array 508 is a linear array of antennas (e.g., antenna 510, antenna 512), but can have other configurations within examples. As such, corrugated radome 502 may be located relative to antenna array 508 such that the different steps within corrugated radome 502 provide deconstructive interference to reflected radar signals that reflect off of the radome 502 after being transmitted by antenna array 508.

In some instances, when signals are returned from the environment to antenna array 508, some energy may not be accepted (or captured) by one or more antennas. This energy may reflect off the antenna surface and can also become incident on corrugated radome 502. Particularly, corrugated radome 502 may further reflect this energy again back to antenna array 508. As such, the design of corrugated radome 502 may reduce this re-radiation mode and can help improve radar spatial performance as a result.

Corrugated radome 502 may provide protection and conceal antenna array 508 from external elements in the environment. For instance, corrugated radome 502 may couple to a radar unit that includes antenna array 508 and the radar unit may be part of a vehicle radar system. As such, corrugated radome 502 may be aligned relative to antenna array 508 such that the offsets in the step pattern reflect signals in a deconstructive manner towards antenna array 508.

As shown in FIG. 5, corrugated radome 502 is designed to include multiple steps that are arranged in alternating pattern. In some examples, for the steps in corrugated radome 502, each is offset from the adjacent step by a distance equal to one-quarter of a wavelength at a frequency of operation of antenna array 508. In other examples, the step-height may be different based on the angle of transmission and/or reception of electromagnetic energy, or an angle at which minimization of multipath reflects is to be minimized. The offset between steps, represented by offset 518, enables corrugated radome 502 to minimize the negative effects of reflections of the energy transmitted by antenna array 508. For instance, the offset between step 504 and step 506 may minimize the reflections of antenna 510 and antenna 512.

The configuration of the steps and quantity of steps in corrugated radome 502 can vary within examples as further described below with respect to FIGS. 6A-6H. As shown in FIG. 5, each step may include a width dimension 514. More specifically, each step of corrugated 502 includes a width dimension that is represented as follows:

$$\text{Width of Step} = \frac{\text{Lambda}}{2} \times N \qquad [1]$$

where Lambda represents the free space wavelength of the frequency of operation of the antenna array 508 and N represents an integer for scaling the width 514. As one example, it may not be desirable to have a width 514 of the step less than half a wavelength of the frequency of operation.

Additionally, as shown in FIG. 5, each step may include a thickness dimension 516. More specifically, each step of corrugated 502 includes a thickness dimension that is represented as follows:

$$\text{Thickness of Step} = \frac{\text{Lambda}}{2} \times n \quad [2]$$

where Lambda represents the free space wavelength of the frequency of operation of the antenna array 508 and n represents an integer for scaling the thickness 516. As one example, it may not be desirable to have a thickness 516 of the step less than half a wavelength of the frequency of operation. The N scaling factor for the width may be a different scaling factor than n for the thickness.

The step offset 518 between steps within corrugated pattern 502 enables the corrugated radome to cause deconstructive interference of transmitted radar signals that are reflected by the corrugated radome. Particularly, the step offset 518 is represented as follows:

$$\text{Step Offset} = \frac{\text{Lambda}}{4} \times \cos(\text{null angle}) \quad [3]$$

where Lambda is the free space Lamda (i.e., free space wavelength of transmitted signals) and the null angle is the angle at which the radome will provide the deconstructive interference (the angle is measured with respect to broadside from the plane of the array or radome). In some instances, reflections from corrugated radome 502 can be minimized at a particular azimuth angle, specified by the null angle in Equation 3. During the operation of the antenna and the radome, the radome may reflect some of the energy transmitted by an antenna array. When the energy is reflected by the radome, the radome may cause half of the elements in an antenna array to receive a reflection signal that has a 180 degree phase shift with respect to the other half of the antenna array.

To illustrate an example, corrugated radome 502 may be used with an antenna array with 10 radiating elements. In the example, some reflections caused by corrugated radome 502 may be reflected by corrugated radome 502 towards 5 of the radiating elements at a zero degrees relative phase and other reflections towards the other 5 of the radiating elements with 180 degrees relative phase. When the phases are 180 degrees out of phase with each other, they sum to zero. When the two signals sum to zero they cancel each other out deconstructively.

Figure 6A:
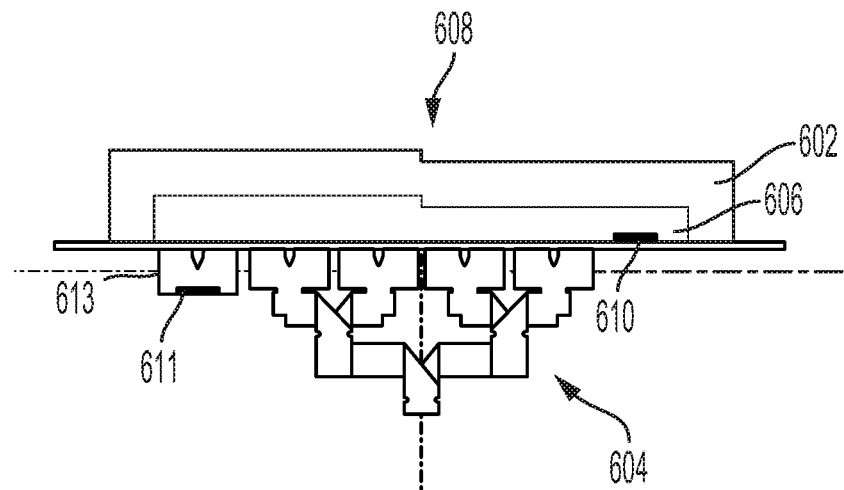
FIG. 6A illustrates a first corrugated radome for a radar unit, according to one or more example embodiments.
Figure 6B:
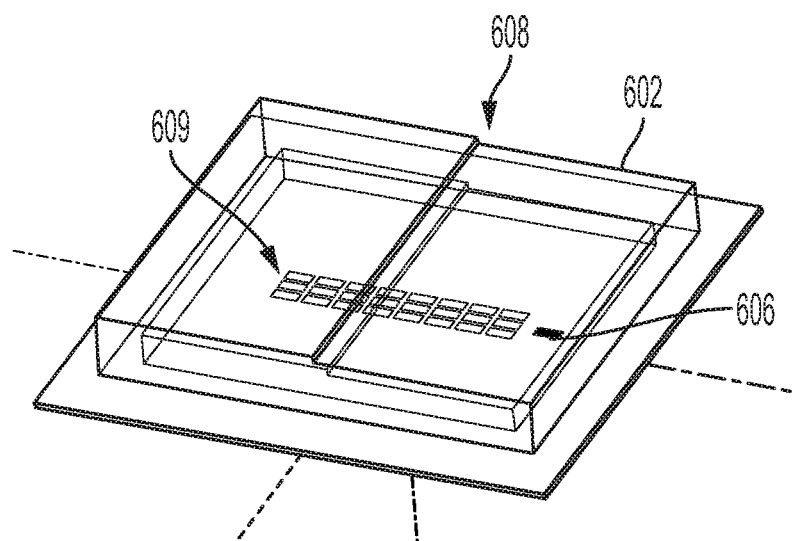
FIG. 6B illustrates another view of the first corrugated radome for the radar unit, according to one or more example embodiments.

FIGS. 6A and 6B illustrate a first corrugated radome for a radar unit, according to one or more example embodiments. First corrugated radome 602 is designed with a single step (i.e., step 608) positioned in a central location of first corrugated radome 602. In other examples, a corrugated radome may include a single step in another location.

First corrugated radome 602 is shown coupled to radar unit 604. First corrugated radome 602 and other radomes presented herein may couple to a radar unit using various means, including mechanical fasteners, adhesives, or may be constructed as part of the radar unit. As such, coupling first corrugated radome 602 causes an empty space 606 to exist between an inner surface of first corrugated radome 602 and radar unit 604.

As shown, first corrugated radome 602 is located in a direction of transmission of the radiation pattern associated with antennas 609. The material of first corrugated radome 602 may interfere with the performance of one or more antennas 609 of radar unit 604. The step pattern consisting of step 608, however, may mitigate some of the impact of first corrugated radome 602 upon performance of antennas 609. Particularly, in some examples, the different step pattern formed in first corrugated radome 602 can direct ringing signals to deconstructively interfere with each other when received by antennas 609.

Step 608 may be configured with a height equal to one-quarter of a wavelength at a frequency of operation of radar unit 604 (or a height equal to one-quarter of a wavelength at a frequency of operation times the cosine of the desired null angle). As a result, half of first corrugated radome 602 may be positioned at a height lower than the other half based on step 608. This differential in height may increase the performance of antennas 609 relative to a basic radome with a step pattern (e.g., basic radome 402 shown in FIG. 4A). The height and/or width may differ in other examples (e.g., one-half of a wavelength, one-eighth of a wavelength).

The radar unit 604 further includes absorption components 610, 611. Absorption component 610 is shown disposed on a top surface of radar unit 604. As such, absorption component 610 may absorb energy caused by first corrugated radome 602. Absorption component 611 includes one or more waveguides (e.g., waveguide 613) configured to cause deconstructive interference. In some examples, absorption component 611 may be constructed as part of waveguides of radar unit 604.

Figure 6C:
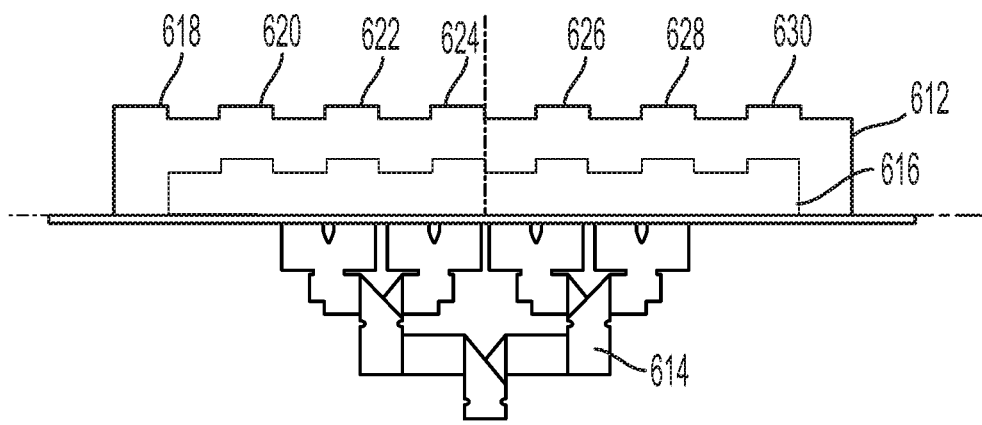
FIG. 6C illustrates a second corrugated radome for a radar unit, according to one or more example embodiments.
Figure 6D:
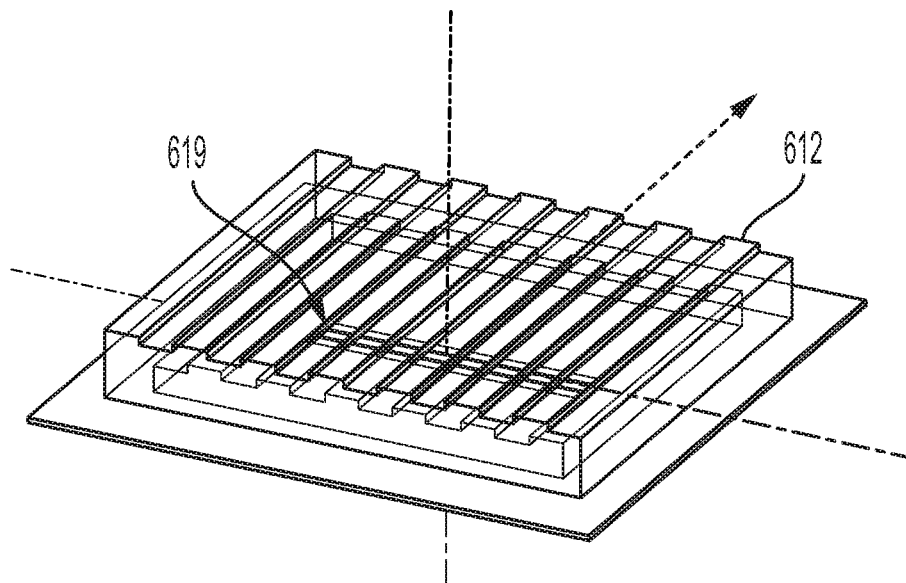
FIG. 6D illustrates another view of the second corrugated radome for the radar unit, according to one or more example embodiments.

FIGS. 6C and 6D illustrate a second corrugated radome for a radar unit, according to one or more example embodiments. Second corrugated radome 612 represents another type of radome that utilizes a corrugated pattern to minimize its impact on the performance of a radar unit. Particularly, second corrugated radome 612 is designed with multiple steps (i.e., step 618, step 620, step 622, step 624, step 626, step 628, and step 630). Steps 618-630 are included to reduce the impact of second corrugated radome 612 on radar signals transmitted by antennas 619 and incoming reflections of radar signals received at antennas 619. In other examples, the arrangement of steps 618-630 may differ. In addition, second corrugated radome 612 may include another quantity of steps in other examples. For instance, the quantity of steps may depend on a quantity of antennas 619 associated with radar unit 614.

Second corrugated radome 612 is shown coupled to radar unit 614. Radar unit 614 may represent any type of radar unit configured to transmit radar signals according to a radiation pattern. As such, second corrugated radome 612 may couple to radar unit 614 such that steps 618-630 are located in the direction of transmission of radar unit 614. This way, steps 618-630 may help reduce radar signals from ringing in empty space 616 that exists between second corrugated radome 612 and radar unit 614. Thus, second corrugated radome 612 may provide protection and conceal radar unit 614 while minimizing its impact on the performance of antennas 619.

Steps 618-630 are shown with a uniform height in the example shown in FIGS. 6C and 6D. For instance, each step may have a height equal to one-quarter of a wavelength at the frequency of operation of radar unit 614 (or a height equal to one-quarter of a wavelength at a frequency of operation times the cosine of the desired null angle). As such, due to the inclusion of steps 618-630, second corrugated radome 612 includes the corrugated pattern that differs from a baseline radome (e.g., baseline radome 402 shown in FIGS. 4A and 4B). In other examples, the height of one or more steps 618-630 may differ. For instance, steps 618-622 may have heights that differ from the heights of steps 624-630.

In some examples, steps 618-630 may have particular locations that depend on the positions of each antenna of antennas 619. The locations may depend on the radiation pattern of antennas 619 to enable each step to direct transmitted signals reflected by second corrugated radome 612 towards nulls in the radiation pattern of antennas 619.

Figure 6E:
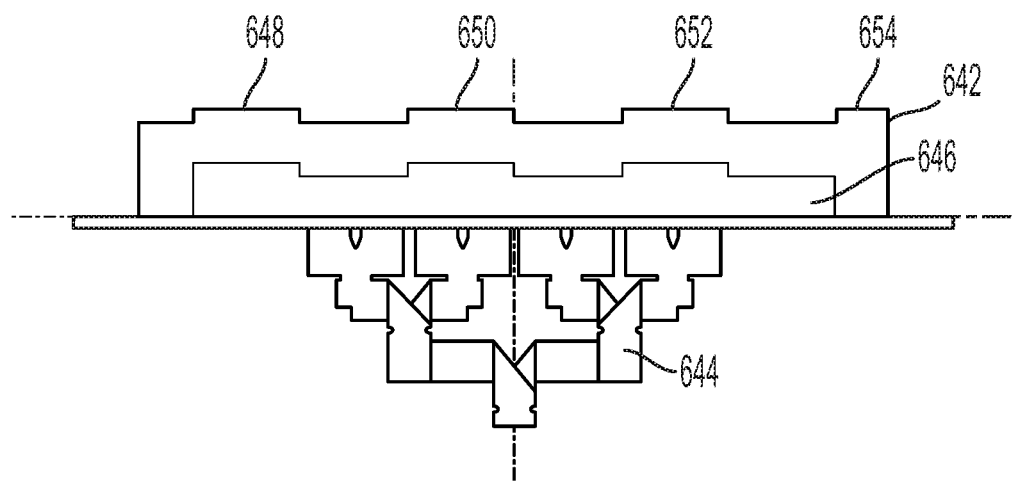
FIG. 6E illustrates a third corrugated radome for a radar unit, according to one or more example embodiments.
Figure 6F:
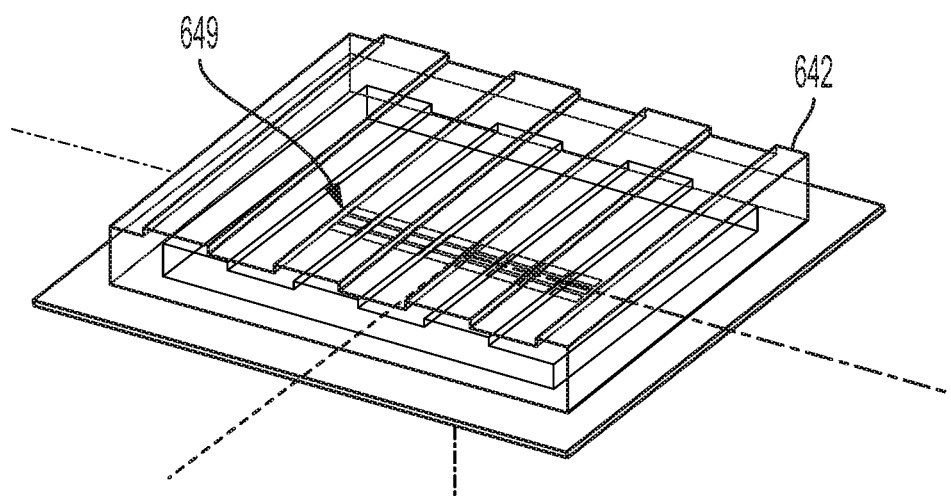
FIG. 6F illustrates another view of the third corrugated radome for the radar unit, according to one or more example embodiments.

FIGS. 6E and 6F illustrate a third corrugated radome for a radar unit, according to one or more example embodiments. Third corrugated radome 642 represents another type of radome that utilizes a corrugated pattern to minimize its impact on the performance of a radar unit. Additional configurations are described below.

Similar to second corrugated radome 612, third corrugated radome 642 is designed with multiple steps (i.e., step 648, step 650, step 652, and step 654). With less steps overall than second corrugated radome 612, steps 648-654 of third corrugated radome 642 are shown each with a longer height dimension than steps 618-630 of second corrugated radome 612. As such, steps 648-654 may be configured to reduce the impact of utilizing third corrugated radome 642 to protect and conceal radar unit 644 on the performance of antennas 649. Particularly, each step 648-654 may be configured to redirect reflections of signals caused by third corrugated radome 642 towards nulls in the radiation pattern of radar unit 644. In addition, third corrugated radome 642 may include another quantity of steps in other examples. For instance, the quantity of steps may depend on a quantity or arrangement of antennas 649 associated with radar unit 644.

Third corrugated radome 642 is shown coupled to radar unit 644 such that steps 648-654 are located in the direction of transmission of radar unit 644. This way, steps 648-654 may help reduce radar signals from ringing in empty space 646 that exists between third corrugated radome 642 and radar unit 644. Thus, third corrugated radome 642 may provide protection and conceal radar unit 644 while minimizing its impact on the performance of antennas 649.

Steps 648-654 are shown with a uniform height in the example shown in FIGS. 6E and 6F. For instance, each step may have a height equal to one-quarter a wavelength at of the frequency of operation of radar unit 644 (or a height equal to one-quarter of a wavelength at a frequency of operation times the cosine of the desired null angle). Due to the inclusion of steps 648-654, third corrugated radome 642 includes the corrugated pattern that differs from a baseline radome (e.g., baseline radome 402 shown in FIGS. 4A and 4B). In other examples, the height of one or more steps 648-654 may differ. For instance, steps 648, 652 may have heights that differ from the heights of steps 650, 654. Other variations are possible.

In some examples, steps 648-654 may have particular locations that depend on the positions of each antenna of antennas 649. The locations may depend on the radiation pattern of antennas 649 to enable each step to direct transmitted signals reflected by third corrugated radome 642 towards nulls in the radiation pattern of antennas 649.

Figure 6G:
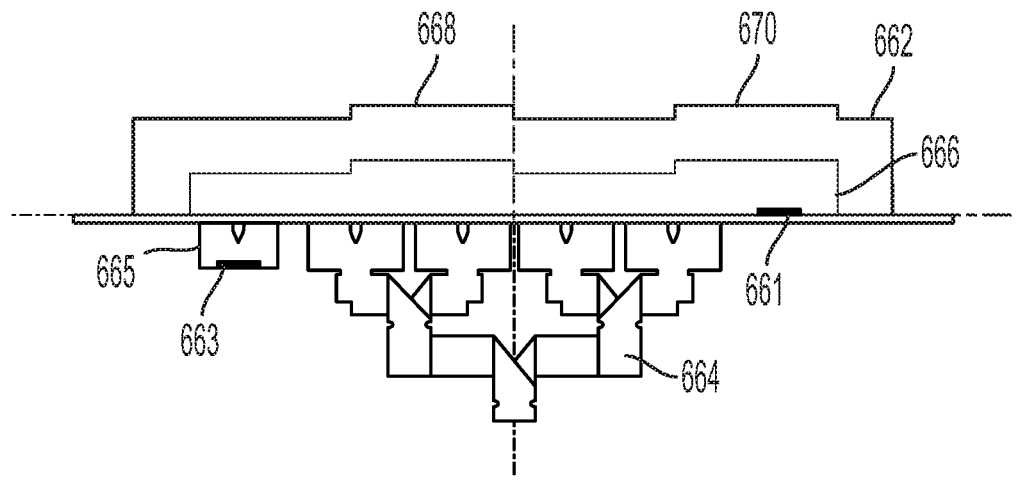
FIG. 6G illustrates a fourth corrugated radome for a radar unit, according to one or more example embodiments.
Figure 6H:
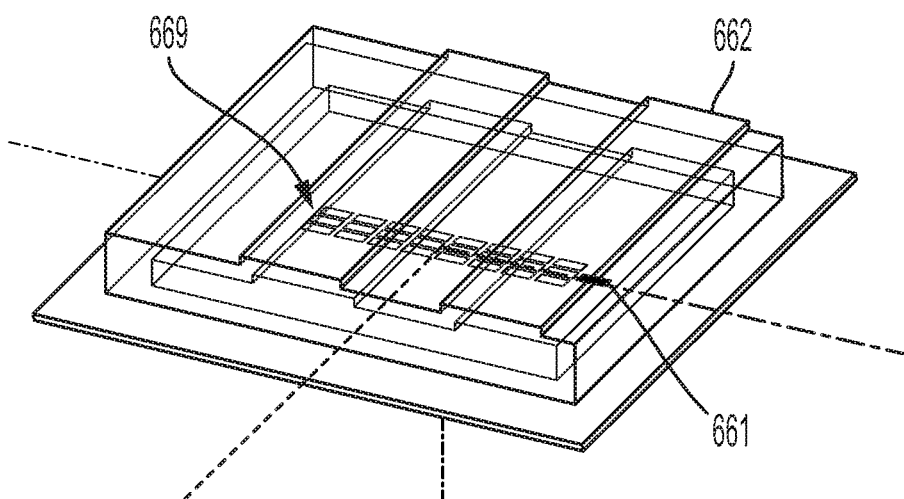
FIG. 6H illustrates another view of the fourth corrugated radome for the radar unit, according to one or more example embodiments.

FIGS. 6G and 6H illustrate a fourth corrugated radome for a radar unit, according to one or more example embodiments. Fourth corrugated radome 662 represents another configuration of a corrugated radome that utilizes steps to minimize its impact on the underlying radar unit (i.e., radar unit 664). Particularly, fourth corrugated radome 662 includes step 668 and step 670 to minimize its impact on the performance of antennas 669 of radar unit 664. In some instances, steps 668-670 may differ in configuration and may align with antennas 669 in a particular way to cause ringing radar signals to be directed towards one or more nulls in the radiation pattern of radar unit 664.

The radar unit 664 further includes absorption components 661, 663. Absorption component 661 is shown disposed on a top surface of radar unit 664. As such, absorption component 661 may absorb energy caused by fourth corrugated radome 662. Absorption component 663 includes one or more waveguides (e.g., waveguide 665) configured to cause deconstructive interference. In some examples, absorption component 663 may be constructed as part of waveguides of radar unit 664. Further, other examples may involve more or fewer absorption components in other configurations.

Figure 7A:
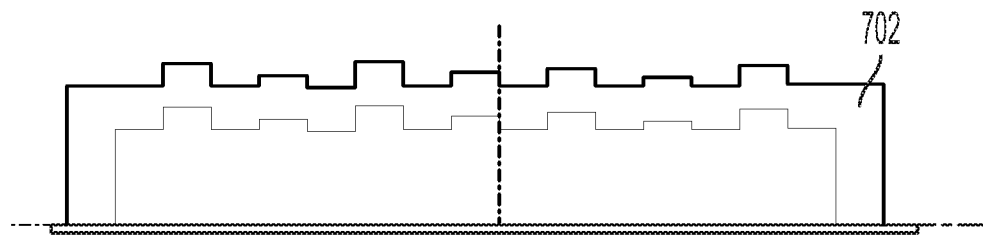
FIG. 7A illustrates step heights for a corrugated radome, according to one or more example embodiments.

FIG. 7A is another example of step heights that may be used with a radome 702. As an example, the step heights may not all be uniform (e.g., some steps may have different heights and/or widths). In some examples, the radar unit may be operated across a bandwidth of frequencies, such as 77 to 78 GHz. Thus, in order to increase the bandwidth of frequencies over which the radome reduces reflections, the step heights may be varied corresponding to frequencies across the bandwidth. For example, some step heights may be taller or shorter than other steps. The smallest steps may correspond to approximately the highest frequencies of the bandwidth and the tallest steps may correspond to the lowest frequencies of the bandwidth.

In other examples, the step heights may have an average (or median) height corresponding to a center frequency of the bandwidth of operation. The step heights may be varied for a respective step from this average (or median) step height. Because of the varied step heights, deconstructive interference may provide reflection cancellation across a wider range of frequencies. Further, even when a step height is not exactly equal to one quarter of the wavelength of the frequency of operation, it may provide some cancellation effects.

Figure 7B:
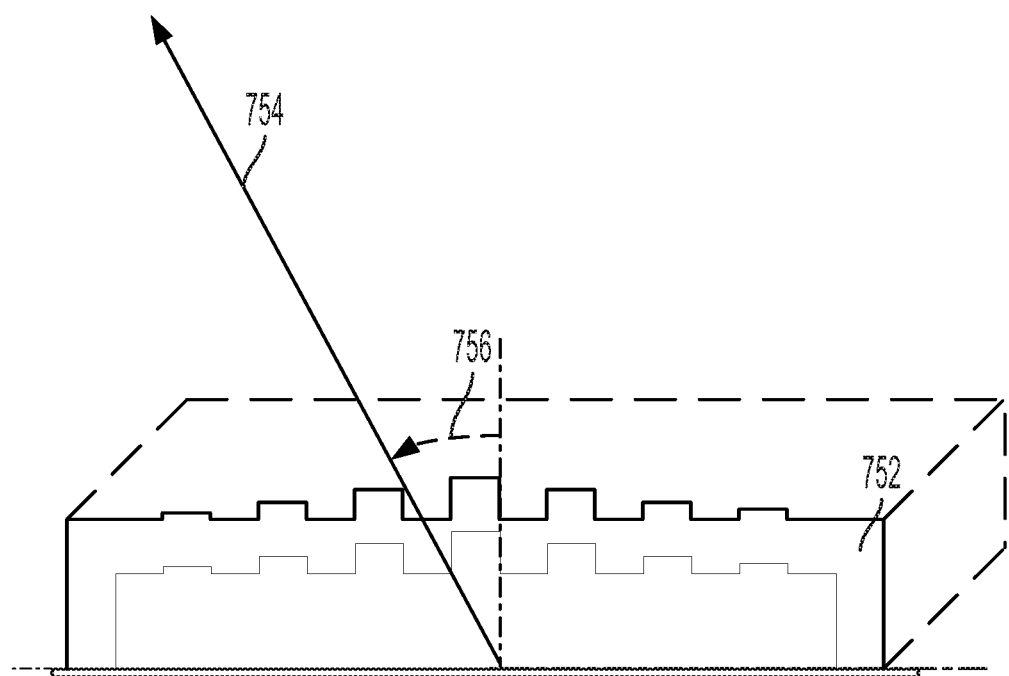
FIG. 7B illustrates additional step heights for a corrugated radome, according to one or more example embodiments.
Figure 7B:
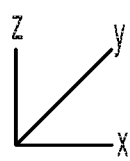

FIG. 7B is another example of step heights that may be used with radome 752. In radome 752, the step height may vary based on incoming or outgoing radar signals 754 and a position of the radome with respect to an angle 756 between the signal 754 and a center of the array. The step height at a respective location may be equal to one-quarter of a wavelength at a frequency of operation times the cosine of the angle between the location of the radome and a center of the antenna array under the radome. Thus, the tallest steps may be over the center of the antenna array and the steps may get smaller the further away from the center the angle measures. Additionally, in some examples, the steps may also vary in height according to a position in the y-direction (e.g., into or out of the page) as the angle changes as well. Thus, at any x-y position of the radome, a corresponding step height may be based on the angle from the x-y position to a center position of the antenna array.

In some other examples, the step height used with a corrugated radome may be varied based on some other criteria. Other criteria may include, but are not limited to, an average center position of all antenna elements of the radome, a center position of a respective array, or a center position of the radome, or a center position of the antenna block.

Figure 8:
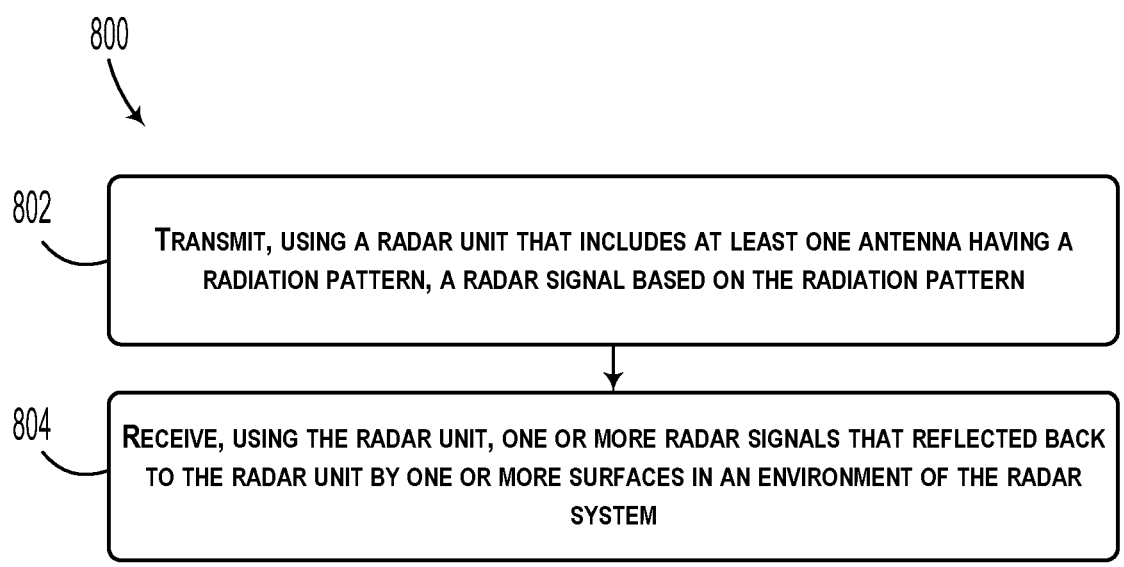
FIG. 8 illustrate a method of operating a radar system, according to one or more example embodiments.

FIG. 8 is a flowchart of example method 800 for operating a radar system, according to one or more embodiments. Method 800 may include one or more operations, functions, or actions, as depicted by one or more of blocks 802 and 804, each of which may be carried out by any of the systems shown in prior figures, among other possible systems.

Those skilled in the art will understand that the flow chart described herein illustrate functionality and operation of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art.

Block 802 involves transmitting, using a radar unit that includes at least one antenna having a radiation pattern, a radar signal based on the radiation pattern. The radar system includes a radome located in a direction of transmission of the radiation pattern. The radome may include a stepped surface having at least one step. For instance, the radome may have a design similar to one of the radomes shown in FIGS. 6A-6H or FIGS. 7A-7B. As such, the at least one step in the radome may have a height equal to one-quarter of a wavelength at a frequency of operation of the radar unit (or a height equal to one-quarter of a wavelength at a frequency of operation times the cosine of the desired null angle). In addition, the at least one step may be positioned on the radome such that the at least one step causes deconstructive interference of reflections of the transmitted radar signal caused by the radome. For instance, the one or more steps in the radome may direct reflections caused by the radome towards the null of the radiation pattern, or in the direction of a desired null angle.

The radome may be coupled to the radar unit such that an empty space exists between the radome and the at least one antenna. As such, the radome may enclose the at least one antenna.

In some examples, the radar unit may include multiple antennas arranged in a linear array. For instance, the antennas may include one or more of a synthetic aperture radar (SAR) array, a multiple-input multiple-output (MIMO) transmission array, and a receiver array. The radar unit may also include antennas arranged in other configurations.

Block 804 involves receiving, using the radar unit, one or more reflections that reflected back to the radar unit by one or more surfaces in an environment of the radar system. These reflections may enable the radar system to determine aspects of the environment, such as locations and movements of objects relative to the radar system.

Some examples of method 800 may further involve transmitting, using a second radar unit that includes at least one antenna having a second radiation pattern, a second radar signal based on the second radiation pattern. The radar system may include a second radome located in a direction of transmission of the second radiation pattern.

In some examples, the radar system may further include an absorption component coupled to the radar unit such that the absorption component absorbs reflections of the transmitted radar signal. For instance, the absorption component may include one or more waveguides configured to cause deconstructive interference. The one or more waveguides may be part of the radar unit. In other examples, the absorption component may include radio frequency (RF) absorption material positioned relative to the null angle. The RF absorption material may be configured to absorb the reflections of the transmitted radar signal.

In some examples, the radar system may further include a second radar unit comprising at least one antenna having a second radiation pattern, wherein the second radar unit is configured to: (i) transmit a second radar signal based on the second radiation pattern, and (ii) receive radar signals. The radar system may also include a second radome located in a direction of transmission of the second radiation pattern. As such, the radar unit may be coupled at a first location of a vehicle and the second radar unit may be coupled at a second location of the vehicle.

In some examples, the radar system may also include a processing unit. The processing unit may be configured to perform a beam forming process using one or more radar units. The processing unit may also be configured to perform beam steering. As such, the processing unit may be configured to mitigate reflections of the transmitted radar signal caused by the radome.

In some examples, the radome may include one or more polarization filters. The polarization filters may adjust the operation of the radar unit (e.g., change polarization of transmitted radar signals).

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A radar system comprising:
    a radar unit that includes a plurality of antennas having a radiation pattern, wherein the plurality of antennas are arranged in a linear array, and wherein the radar unit is configured to: (i) transmit a radar signal based on the radiation pattern, and (ii) receive radar signals; and
    a radome located in a direction of transmission of the radiation pattern, wherein the radome includes a stepped surface having at least one step, wherein the at least one step has a height chosen such that the at least one step causes deconstructive interference of reflections of the transmitted radar signal caused by the radome.

2. The radar system of claim 1, wherein the radome is coupled to the radar unit such that an empty space exists between the radome and the plurality of antennas.

3. The radar system of claim 2, wherein the radome encloses the plurality of antennas.

4. The radar system of claim 1, wherein the stepped surface having the at least one step comprises:
a plurality of steps, wherein each step of the plurality of steps includes the height equal to one-quarter of a wavelength at a frequency of operation of the radar unit times the cosine of a desired null angle.

5. The radar system of claim 4, wherein the plurality of steps are spaced apart such that the plurality of steps collectively cause deconstructive interference of reflections of the transmitted radar signal caused by the radome.

6. The radar system of claim 5, wherein an arrangement of the plurality of steps includes equal spacing between respective steps in the plurality of steps.

7. The radar system of claim 5, wherein a first half of the radome includes more steps than a second half of the radome.

8. The radar system of claim 1, wherein the plurality of antennas arranged in the linear array comprises an array selected from the group consisting of:
a synthetic aperture radar (SAR) array;
a multiple-input multiple-output (MIMO) transmission array; and
a receiver array.

9. The radar system of claim 1, further comprising:
an absorption component coupled to the radar unit such that the absorption component absorbs reflections of the transmitted radar signal.

10. The radar system of claim 9, wherein the absorption component includes one or more waveguides configured to cause deconstructive interference.

11. The radar system of claim 9, wherein the absorption component includes radio frequency (RF) absorption material positioned relative to a null of the radiation pattern, wherein the RF absorption material is configured to absorb the reflections of the transmitted radar signal.

12. The radar system of claim 1, wherein the radar unit is a first radar unit, wherein the radome is a first radome, and wherein the radar system further comprises:
a second radar unit that includes at least one antenna having a second radiation pattern, wherein the second radar unit is configured to: (i) transmit a second radar signal based on the second radiation pattern, and (ii) receive second radar signals; and
a second radome located in a direction of transmission of the second radiation pattern, wherein the second radome includes a second stepped surface having at least one step, where the at least one step of the second stepped surface includes a height equal to one-quarter of a wavelength at a frequency of operation of the second radar unit times the cosine of a second desired null angle, and wherein the at least one step of the second stepped surface is positioned on the second radome such that the at least one step of the second stepped surface causes deconstructive interference of reflections of the transmitted second radar signal caused by the second radome.

13. The radar system of claim 12, wherein the second radome differs from the first radome, and wherein the first radar unit is coupled to a vehicle at a first location and the second radar unit is coupled to the vehicle at a second location.

14. The radar system of claim 1, wherein the radome causes half of the antennas in the plurality to receive the reflections with a 180-degree phase shift from the reflections as received by the other half of the antennas in the plurality.

15. A radar unit comprising:
a plurality of antennas having a radiation pattern, wherein the plurality of antennas are arranged in a linear array, and wherein the radar unit is configured to: (i) transmit a radar signal based on the radiation pattern, and (ii) receive radar signals; and
a radome located in a direction of transmission of the radiation pattern, wherein the radome includes a stepped surface having at least one step, wherein the at least one step has a height chosen such that the at least one step causes deconstructive interference of reflections of the transmitted radar signal caused by the radome.

16. The radar unit of claim 15, wherein the radome includes one or more polarization filters.

17. The radar unit of claim 15, wherein the radome causes half of the antennas in the plurality to receive the reflections with a 180-degree phase shift from the reflections as received by the other half of the antennas in the plurality.

18. A method of operating a radar system comprising:
transmitting, using a radar unit that includes a plurality of antennas arranged in a linear array and having a radiation pattern, a radar signal based on the radiation pattern, wherein the radar system includes a radome located in a direction of transmission of the radiation pattern, wherein the radome includes a stepped surface having at least one step, and wherein the at least one step has a height chosen such that the at least one step causes deconstructive interference of reflections of the transmitted radar signal caused by the radome; and
receiving, using the radar unit, one or more radar signals that are reflected back to the radar unit by one or more surfaces in an environment of the radar system.

19. The method of operating the radar system of claim 18, wherein the radar unit is a first radar unit, wherein the radome is a first radome, and wherein the method further comprises:
transmitting, using a second radar unit that includes at least one antenna having a second radiation pattern, a second radar signal based on the second radiation pattern, wherein the radar system includes a second radome located in a direction of transmission of the second radiation pattern, wherein the second radome includes a second stepped surface having at least one step, where the at least one step of the second stepped surface has a height equal to one-quarter of a wavelength at a frequency of operation of the second radar unit times the cosine of a second desired null angle, and wherein the at least one step of the second stepped surface is positioned on the second radome such that the at least one step of the second stepped surface causes deconstructive interference of reflections of the transmitted second radar signal caused by the second radome; and
receiving, using the second radar unit, one or more radar signals that are reflected back to the radar unit by one or more surfaces in the environment of the radar system.

20. The method of operating the radar system of claim 18, wherein the radome causes half of the antennas in the plurality to receive the reflections with a 180-degree phase shift from the reflections as received by the other half of the antennas in the plurality.

\* \* \* \* \*